Nov. 5, 1940.                J. OLSSON                2,220,173
              VALVE GEAR FOR RECIPROCATING ENGINES
              Filed March 18, 1938         3 Sheets-Sheet 1
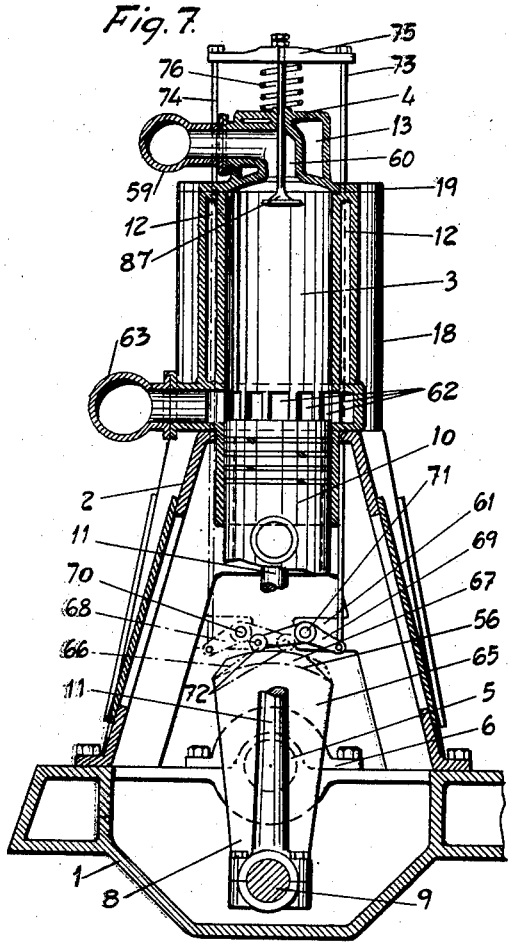
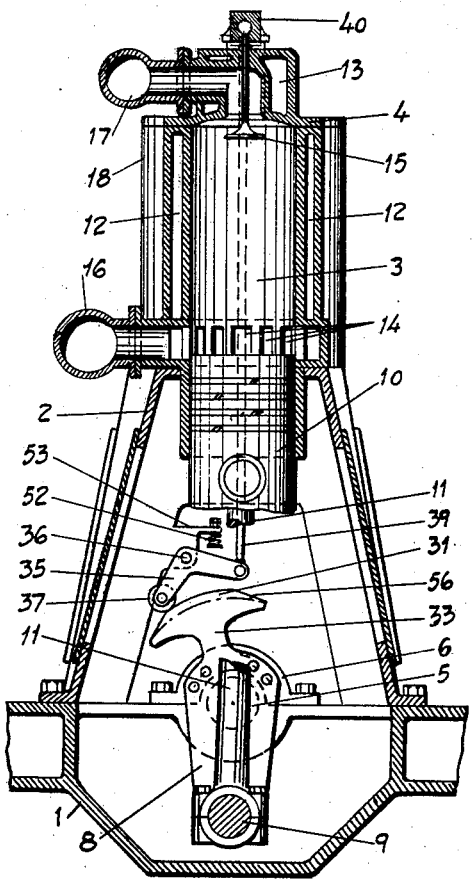
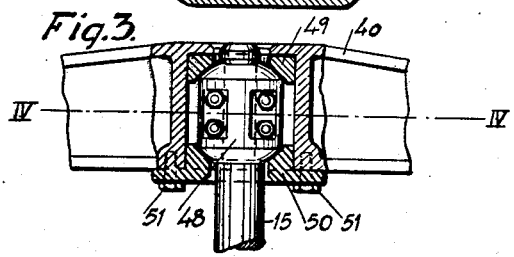
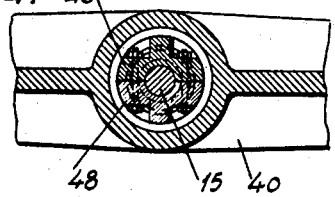
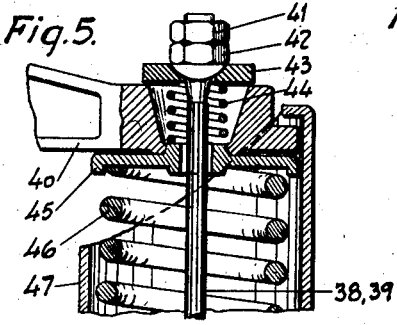
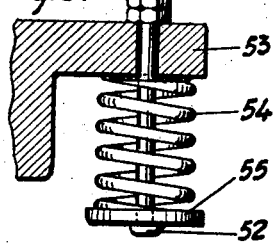

Nov. 5, 1940.    J. OLSSON    2,220,173
VALVE GEAR FOR RECIPROCATING ENGINES
Filed March 18, 1938    3 Sheets-Sheet 2
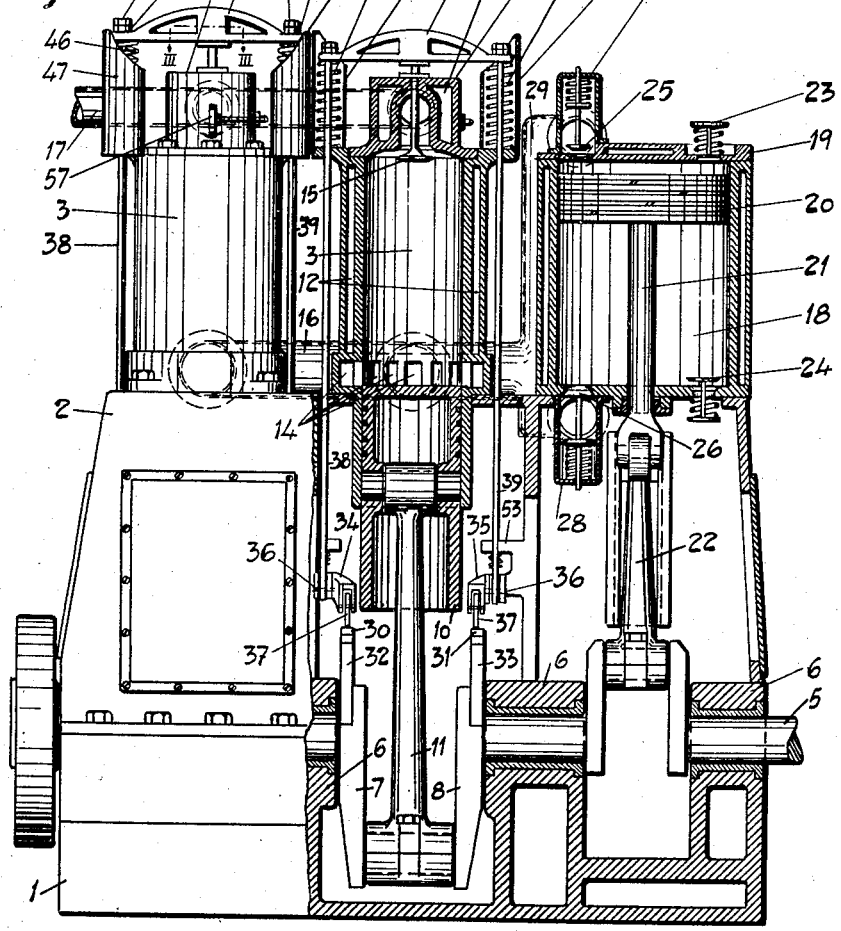

Nov. 5, 1940.  J. OLSSON  2,220,173
VALVE GEAR FOR RECIPROCATING ENGINES
Filed March 18, 1938   3 Sheets-Sheet 3
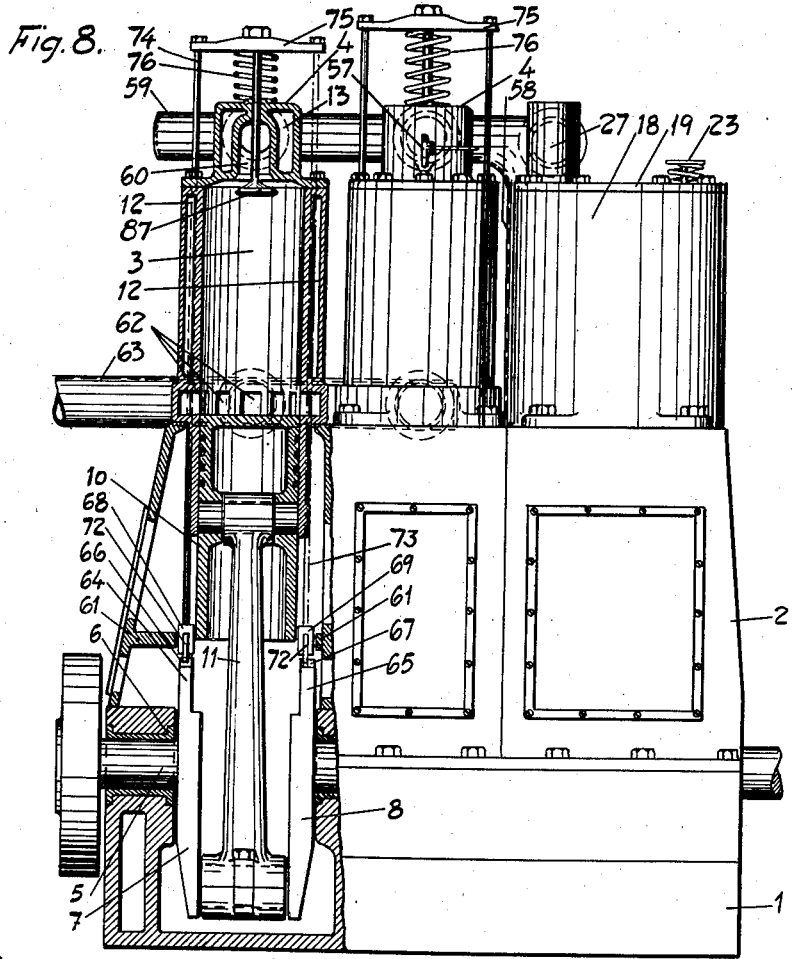
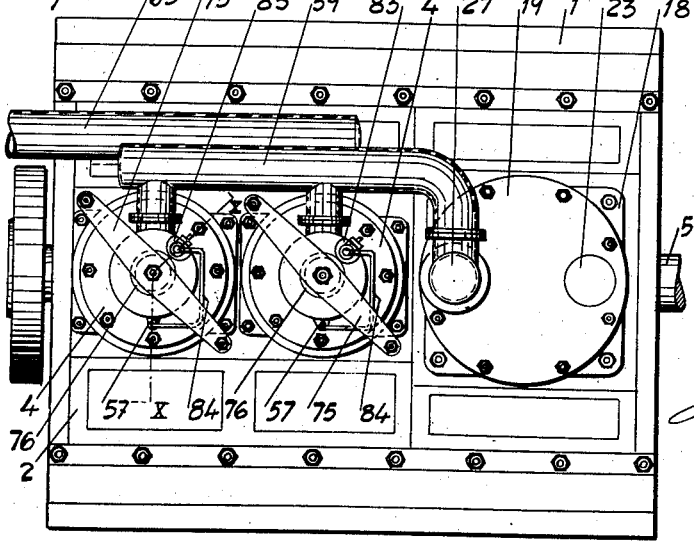
Inventor:
Johannes Olsson
By Jarvis C. Marble
his Attorney Patented Nov. 5, 1940

2,220,173

UNITED STATES PATENT OFFICE 2,220,173

VALVE GEAR FOR RECIPROCATING ENGINES

Johannes Olsson, Goteborg, Sweden, assignor to Aktiebolaget Götaverken, Goteborg, Sweden, a corporation of Sweden Application March 18, 1938, Serial No. 196,637
In Sweden September 17, 1935

9 Claims. (Cl. 123—65)

The present invention relates to the valve gear of reciprocating engines having fixed cylinders and rotating crank shafts, and the invention is particularly directed to such valve gears, in which the movements of the respective valves are controlled by guiding means provided on the main crank shaft itself. However, particularly in multiple cylinder engines it has proved difficult to provide a valve gear, which does not increase the dimensions of the engines, particularly with regard to their length and breadth, and which enables the pertaining mechanisms and parts to be so disposed that the supervision of the movable parts of the engine is not prevented and that the connection of the motor cylinders to two longitudinally disposed manifolds serving as inlet and outlet manifolds for all the cylinders may be easily achieved.

One object of the invention is to eliminate these drawbacks of engines of the above mentioned type such as steam engines, Diesel engines, gas engines etc., and the invention is substantially characterized by the fact that the valves, which may be spring-loaded, are connected by means of a beam with two rods connected with the ends of said beam and disposed in the same way in the longitudinal direction of the respective cylinder, and that guiding means are provided on the crank arms of the main crank mechanism of the respective working cylinder or on counter weights provided or formed thereon, each one of said guiding means being adapted to directly or indirectly actuate one of said rods. According to the invention the rods may be disposed within sectors with the cylinder axis as centre and extending over 60° counted from the longitudinal centre plane of the engine.

Other features of novelty will be hereinafter disclosed in connection with the description of two embodiments of the invention illustrated in the accompanying drawings, in which:

Fig. 1 is a vertical cross section of a Diesel engine according to the invention, Fig. 2 a side elevation and partial longitudinal section of the engine according to Fig. 1, Fig. 3 a section on line III—III in Fig. 2 on a larger scale, Fig. 4 a horizontal section on line IV—IV in Fig. 3, Fig. 5 a partial longitudinal section illustrating the connection between the beam and the tie rods employed in the valve gear of the engine illustrated in Figs. 1 and 2, and Fig. 6 a detail showing an abutment employed in the valve gear illustrated in Figs. 1 and 2, Fig. 7 is a vertical cross section through the cylinder and crankcase of a Diesel engine according to a second embodiment of the invention, Fig. 8 a side elevation and partial longitudinal section of the engine illustrated in Fig. 7, Fig. 9 a plan view of the engine illustrated in Figs. 7 and 8, and Fig. 10 a section on line X—X in Fig. 9 of the top of a combustion cylinder of the engines illustrated in Figs. 1, 2, 7 and 8.

The two cycle solid injection Diesel engine illustrated in Figs. 1–6 comprises a crankcase 1, 2 having combustion cylinders 3 bolted to its upper half 2. The top of each combustion cylinder is covered by a cylinder head 4 in the usual manner. The crank shaft 5 is mounted in bearings 6 in the crankcase and the crank arms 7, 8 are integral with the crank pin 9, which is connected with the piston 10 by means of a connecting rod 11, which is partially broken away in Fig. 1. The cylinder 3 and the cylinder head 4 are provided with cooling jackets 12 and 13, respectively. Openings 14 for the introduction of scavenging and charging air are provided in the lower portion of each cylinder 3, and an exhaust valve 15 is disposed in the cylinder head of each combustion cylinder. Scavenging air is supplied through a conduit 16 common for both cylinders, and the combustion gases are exhausted through a conduit 17. The scavenging and charging air is compressed in a double acting reciprocating compressor, which is built together with the internal combustion engine. The compressor comprises a cylinder 18 provided with a cylinder head 19 and accommodating a double piston 20 connected through a piston rod 21 and a connecting rod 22 to the crank shaft 5. Spring-loaded inlet valves 23 and 24 are provided in the top and bottom, respectively, of the compressor cylinder. Spring-loaded outlet valves 25 and 26 are provided in valve housings 27 and 28, respectively, secured to the top and bottom of the compressor cylinder 18 and communicating through a manifold 29, Fig. 2, with the air supply conduit 16 of the internal combustion engine.

According to the invention the valves 15 are controlled by guiding means provided on the crank arms and comprising cams 30 and 31 formed on the counterweights 32 and 33, respectively, which are bolted to the crank arms 7 and 8. These cams cooperate with two double-armed levers 34 and 35 journalled on pivots 36 secured in the upper half 2 of the crankcase. The levers 34, 35 carry rollers 37 at one end, which roll on the guiding cams of the counterweights. The opposite ends of the levers 34, 35 are pivotally connected with tie rods 38, 39 pivotally connected at their upper ends with the ends of a beam 40. At one end the tie rods are preferably provided with means for adjustment of their length. Said means may, for instance, comprise two nuts 41, 42 screwed onto the upper ends of the tie rods, the nut 42 having, for instance, a spherical surface engaging a corresponding spherical surface of a washer 43 thus forming a ball-type joint, as illustrated in Fig. 5. The washer 43 rests on a spring 44 interposed between said washer and a washer 45. A spring 46 provided in a cylinder 47 rests with its lower end on the top of the cylinder 3 and the two springs 46 at each cylinder tend to move the respective beam 40 upwards and thereby to close the respective valve 15. The design of the connection between the tie rods 38, 39 and the beam 40 results in a certain movability and elasticity of the connection between said parts so that the valve gear does not get completely inoperable even if one of the tie rods 38, 39 by some reason should stick or break. Naturally, the valve 15 may be connected with the beam 40 in any manner. Figs. 3 and 4 illustrate a valve stem connection, which comprises a ball joint providing a certain movability between the beam 40 and the valve stem, so that the latter is not subjected to bending stresses originating from the beam 40. For this purpose two blocks 48 are secured on the upper end of the valve stem, said blocks being partially provided with spherical surfaces resting in spherical bearing cups 49, 50 fitted in a recess in the middle of the beam 40 and secured by means of screws 51, as illustrated in Figs. 3 and 4. Apart from a certain movability this arrangement enables the cylinder head and the valve to be removed without disconnection of the beam 40 and the other parts of the valve gear. Naturally, a spring disposed between the cylinder head and the beam coaxially with the valve may be provided for moving the valve towards its seat, as will be hereinafter disclosed in connection with the embodiment illustrated in Figs. 7, 8 and 9, and obviously the springs 46 may then be dispensed with.

In order to limit the movements of the tie rods 38, 39 and to prevent the rods and the double-armed levers 34, 35 from taking unsuitable or dangerous positions, for instance upon valve stem breakage or other defects, resilient abutments 52 are provided on projections 53 from the upper half 2 of the crankcase and prevent the levers 34, 35 from making too large movements. These resilient abutments may comprise a rod 52 actuated by a spring 54 interposed between a washer 55 on said rod and the projection 53, as illustrated in detail in Fig. 6.

During the main part of each revolution of the crank shaft the rollers 37 are out of engagement with the counterweights 32, 33. During this period the springs 46 and the gas pressure in the cylinder keep the valve 15 against its seat and the beam 40 with the tie rods 38, 39 lifted. Then the rollers 37 are situated at such a distance from the centre of the crank circle that a certain play exists between the rollers and the circle 56 indicated in dotted lines on the counterweights. When the counterweights travel in under the rollers 37 the rollers move over the cams 30, 31. The two tie rods 38, 39 are then pulled downwards by the levers 34, 35 and the beam 40 is moved downwards and opens the respective valve 15 against the action of the springs 46. The arrangement of the beam has then, among others, the advantage that irregularities in the cams 30, 31 of the two counterweights are equalized and that the valve gear is symmetrical relatively to the cylinder centre. A further advantage of the valve gear illustrated in Figs. 1 and 2 consists in the fact that the rods 38, 39 are only subjected to tension, and, since the valves 15 are only actuated during periods of the piston motion, when a low pressure prevails in the cylinder, the forces acting upon the rods and the entire valve gear are relatively small so that said parts may be given small dimensions.

The invention is of special importance for such two cycle engines, in which fuel is supplied to the cylinder by a pump operated by the compression pressure in the cylinder, but naturally any known fuel injection system may be employed in connection with the invention. In Fig. 2 a fuel injection valve 57 is indicated. The fuel injection system just mentioned is, however, of special advantage and will therefore be further described below in connection with Fig. 10.

A further embodiment of the invention is illustrated in Figs. 7, 8, 9 and 10. In these figures the same reference numerals as in Figs. 1–6 have been used to indicate parts having their equivalence in Figs. 1–6, and consequently only the differing parts will be dealt with in the following description of these figures. Figs. 7, 8 and 9 illustrate a two cycle Diesel engine comprising two combustion cylinders 3 and a compressor cylinder 18 adapted to produce the necessary charging and scavenging air. The compressed air from the compressor is conducted to the cylinders 3 through an air manifold 58 communicating at the top and bottom with the compressor cylinder and through the conduit 59 with the air inlet openings 60 of the combustion cylinders. The air inlet is controlled by the valve 87. The combustion gases are exhausted from the combustion cylinders through exhaust ports 62 and the exhaust conduit 63 common for both cylinders. The crank arms 7 and 8 are integral with the counterweights 64 and 65, respectively, which have cams 66, 67 provided thereon. Double-armed levers 68 and 69 are pivotally mounted on pivots 70, 71 provided on projections 61 from the upper half 2 of the crankcase. The double-armed levers 68, 69 are provided at one end with rollers 72, which in normal position of the levers are positioned coaxially at a distance from the crank circle centre represented by the circle 56 in Fig. 7. In Fig. 7 the cam 67 and the lever 68, which lie above the plane of the drawing, are indicated in dotted lines and this figure illustrates the difference in the configuration of the cams 66 and 67 necessary to enable the levers to move simultaneously and synchronously. The outer ends of the levers 68, 69 are pivotally connected by means of tie rods 73 and 74, respectively, with a beam 75, which is disposed above the top of the cylinder and forms an angle of 45° with the longitudinal centre plane of the engine, as illustrated in Fig. 9. At the centre of the beam 75 the stem of the air inlet valve 87 is secured, and a spring 76 coaxial with the valve stem is interposed between the cylinder head 4 and the beam 75 and tends to move the valve 15 against its seat and the beam 75 with the tie rods 73 and 74 upwards. The connection between the beam and the valve stem may be of the construction illustrated in Figs. 3 and 4.

Fig. 10 is a section on line X—X in Fig. 9 through the top of a combustion cylinder of a Diesel engine according to the invention and illustrates a fuel supply device provided in the cylinder head 4. A differential piston 77 is movable in a bore 78 in the cylinder head 4, which bore communicates with the compression chamber of the cylinder through a duct 79. A spring 80 tends to move the piston 77 downwards. The small end 81 of the differential piston is movable in a bore 82 in a block 83, which communicates with the fuel injection valve 57 through a pipe 84 and with the fuel supply pipe 85 through ducts in the block 83 controlled by a spring-loaded ball valve 86. When the valve 87 is closed and the working piston 10 moves towards the cylinder top, the compression pressure in the cylinder rises sufficiently to force the differential piston 77 upwards and thereby to produce fuel injection into the cylinder. Upon the downward stroke of the piston 10 the spring 80 or the pressure of the fuel in the pipe 85 causes the differential piston to move downwards and a new quantity of fuel to be introduced into the bore 82. The fuel injection system illustrated in Fig. 10, which may naturally be used in all the embodiments of the present invention illustrated in the drawings, has the advantage that the usual cam shaft employed for operation of the fuel injection apparatus in solid injection internal combustion engines may be dispensed with.

The embodiments of the invention above described and illustrated on the drawings should only be considered as examples, and the valve gear according to the invention may naturally be modified in several different ways without departing from the principle of the invention. Consequently, the invention is not limited to two cycle solid injection Diesel engines of the types illustrated in the drawings but may also be employed with advantage in other Diesel engines as well as in other internal combustion engines such as explosion engines, gas engines, etc., and the invention may also be employed in other reciprocating engines such as gas or steam engines. The tie rods comprised in the valve gear and disposed substantially parallel to the cylinder axis may be disposed in a plane, which differs from the longtitudinal centre plane of the engine, and which may, for instance, fall within a sector having its centre on the cylinder axis and extending some 60° on both sides of said longitudinal centre plane as illustrated in Fig. 9. The guiding means provided on the crank arms may also be formed in different ways from those illustrated in the drawings, and the levers connected with the lower ends of the rods may be disposed in different ways and may also comprise single armed levers or may be totally dispensed with. The invention may also be employed in engines having inlet valves as well as exhaust valves provided in the cylinder head and in such cases both valves may be operated by means of valve gears according to the invention.

What I claim is:

1. In a reciprocating engine, a fixed working cylinder, a rotating crankshaft, a main working piston in said cylinder, a crank on said crankshaft, a connecting rod connecting said main working piston with said crank, a beam, an opening in said cylinder defined by a valve seat, a valve operatively associated with said beam and movable to and from said valve seat and adapted to control said opening of the working cylinder and to open toward the interior of said cylinder, two rods connected with said beam, one on each side of said valve, two crank arms on said shaft and cams provided on said crank arms adapted to simultaneously actuate said rods to operate the valve.

2. In a reciprocating engine, a fixed working cylinder, a rotating crankshaft, a main working piston in said cylinder, a crank on said crank shaft, a connecting rod connecting said main working piston with said crank, a beam substantially in the longitudinal center plane of the engine, an opening in said working cylinder defined by a valve seat, a valve movable to and from said valve seat and connected with said beam between the ends of the beam and adapted to control said opening of the working cylinder and to open toward the interior of said cylinder, two rods extending substantially in the longitudinal direction of said cylinder and at one end connected with said beam with one rod on each side of said valve, two crank arms comprised in said crank, and cams on said crank arms adapted to simultaneously actuate said rods at their opposite ends to operate the valve.

3. In a reciprocating engine, a fixed working cylinder, a rotating crankshaft, a main working piston in said working cylinder, a crank on said crankshaft, a connecting rod connecting said main working piston with said crank, a beam, an opening in said working cylinder defined by a valve seat, a valve operatively associated with said beam and movable to and from said valve seat and adapted to control said opening of the working cylinder and to open toward the interior of said cylinder, two rods connected with said beam, one on each side of said valve, and cams provided on said crankshaft and adapted to simultaneously pull said rods to operate the valve.

4. In a reciprocating engine, a fixed working cylinder, a rotating crank shaft, a main working piston in said working cylinder, a crank on said crank shaft, a connecting rod connecting said main working piston with said crank, a beam forming an angle less than 60° with the longitudinal centre plane of the engine, a mushroom valve connected with said beam between the ends of the beam, two rods extending substantially in the longitudinal direction of the respective cylinder and at one end connected with said beam one on each side of said valve, two crank arms comprised in said crank shaft, and guiding means on said crank arms adapted to actuate said rods at their opposite ends to operate the valve.

5. A valve gear for reciprocating engines having fixed working cylinders and rotating crank shafts and comprising a beam, a valve connected with said beam between the ends of the beam, two rods connected at one end with said beam one on each side of said valve, two crank arms comprised in the main crank mechanism of the respective cylinder and provided on said crank shaft, and a counter weight on each one of said crank arms forming a cam adapted to actuate the opposite ends of said rods to operate the valve.

6. A valve gear for reciprocating engines having fixed working cylinders and rotating crank shafts and comprising a beam, a valve connected with said beam between the ends of the beam, two rods connected at one end with said beam one on each side of said valve, each rod having a lever pivotally connected with the opposite end of said rod, resilient abutments provided on portions of the crankcase of the engine and adapted to confine the movements of said levers in one direction, two crank arms comprised in the main crank mechanism of the respective cylinder and provided on said crank shaft, and counter weights on said crank arms forming cams adapted to cooperate with said levers to operate said rods and the valve.

7. In a reciprocating engine, a fixed working cylinder, a rotating crank shaft, a main working piston in said working cylinder, a crank on said crank shaft, a connecting rod connecting said main working piston with said crank, a beam, a valve connected with said beam between the ends of the beam and provided in the cylinder head of the respective cylinder, a spring at each end of said beam disposed between said beam and the top of the cylinder and acting to move said beam so as to close said valve, two rods connected at one end with said beam one on each side of said valve, two crank arms in said crank, and cams provided on said crank arms adapted to actuate the opposite ends of said rods to operate the valve against the action of said springs.

8. A valve gear for reciprocating engines having fixed working cylinders and rotating crank shafts and comprising a beam, a valve connected with said beam between the ends of the beam by means of a ball joint connection, two rods connected at one end with said beam by means of resilient ball joint connections one on each side of said valve, two crank arms comprised in the main crank mechanism of the respective cylinder and provided on said crank shaft, and guiding means on said crank arms adapted to actuate the opposite ends of said rods to operate the valve.

9. In a reciprocating solid injection combustion engine, a fixed working cylinder, a rotating crank shaft, a main working piston in said working cylinder, a crank on said crank shaft, a connecting rod connecting said main working piston with said crank, a beam, a valve connected with said beam between the ends of the beam, two rods connected at one end with said beam one on each side of said valve, two crank arms in said crank, cams provided on said crank arms adapted to actuate the opposite ends of said rods to operate the valve, a differential piston in the cylinder head of the respective combustion cylinder, a communication between the large end of said differential piston and the compression chamber of the combustion cylinder, a fuel supply conduit communicating with the small end of the differential piston, a check valve in said communication, a fuel injection valve, and a communication between said small end of the differential piston and said fuel injection valve.

JOHANNES OLSSON.